April 22, 1969    J. A. PATTERSON    3,439,529
OSMOMETER EMPLOYING ULTRASONIC RADIATION
Filed Aug. 16, 1966
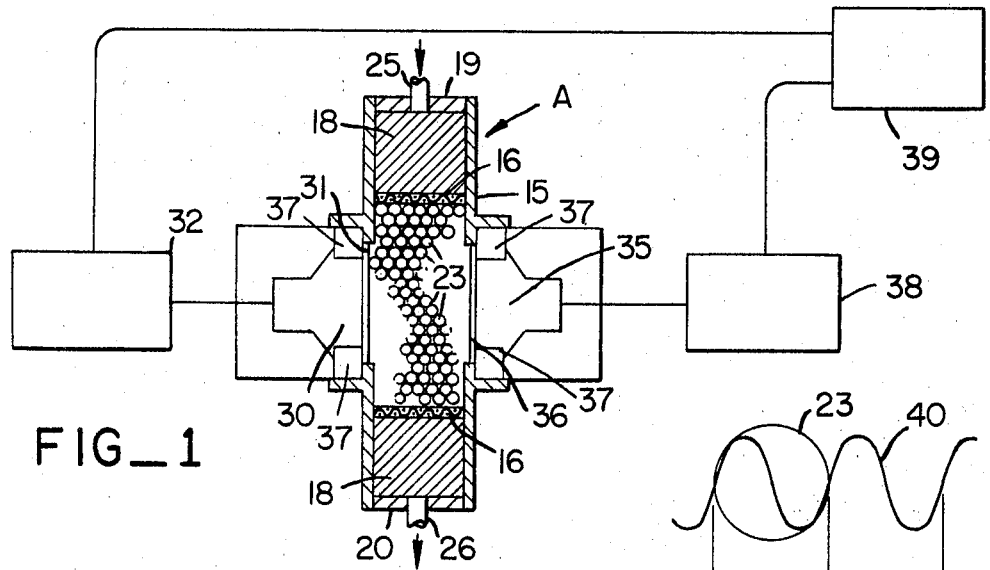
FIG_1
FIG_3
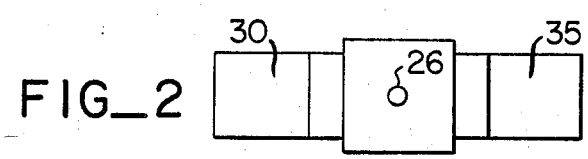
FIG_2
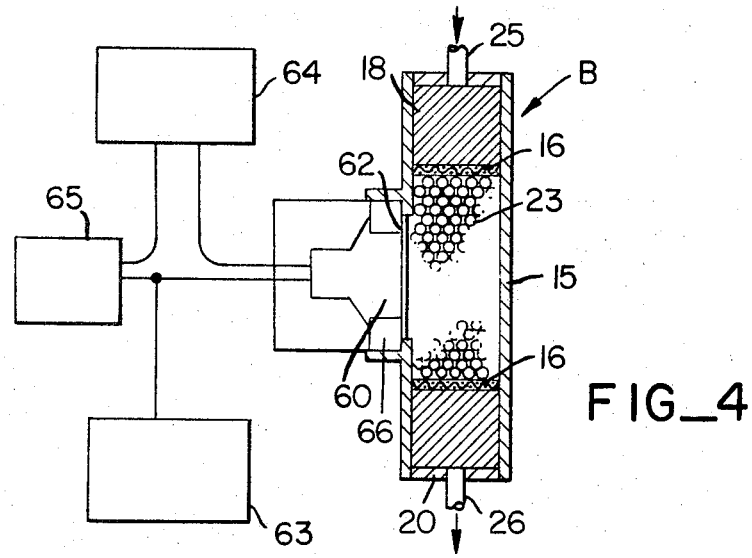
FIG_4
INVENTOR.
JAMES A. PATTERSON
BY
*Townsend & Townsend*
ATTORNEYS United States Patent Office 3,439,529
Patented Apr. 22, 1969

3,439,529
OSMOMETER EMPLOYING ULTRASONIC
RADIATION
James A. Patterson, 727 Viola Place,
Los Altos, Calif. 94022
Filed Aug. 16, 1966, Ser. No. 572,714
Int. Cl. G01n 11/00
U.S. Cl. 73—64.3                    10 Claims

ABSTRACT OF THE DISCLOSURE

A method and apparatus for determining the change in size of spherical particles in a solid stress osmometer wherein ultrasonic energy having a wavelength approximately the diameter of the spheres is passed through the particle chamber of the osmometer before and after a fluid is passed through the osmometer. Any change in size of the particles due to the fluid contact is indicated by a change in the attenuation of the ultrasonic energy.

---

This invention relates to an osmometer and to a method of and apparatus for determining variations in diameter of a plurality of similar sized spherical members.

In applicant's co-pending patent application, filed Apr. 5, 1966, bearing Ser. No. 540,317, entitled, Analytical Method and Free Energy Measuring Apparatus, there is described a technique for nondestructive measuring of the activity of aqueous or nonaqueous fluids. This is accomplished by measuring the induced solid stress on a packed bed of suitable polymeric particles of the type that are sensitive to the fluid in terms of solvation and swelling or contracting in relation to the activity of the fluid.

In the aforesaid application, cross-linked polymers formed into a plurality of symmetrical spheres are placed in a chamber through which fluid is passed. The increase or decrease in volume or pressure of the spheres as a result of the interaction of the fluid with the spheres is then measured to determine the activity of the fluid. In the subject application, the change in volume was measured by mechanical means in which the total volumetric change of the areas occupied by the spheres was measured.

The present invention is concerned with a technique for using ultrasonic radiation which passes through the chamber carrying the spherical bodies in which the frequency of the ultrasonic energy is of a wavelength related to the diameter of the spheres. It has been found that the maximum ultrasonic energy will be absorbed by the spheres when the spheres have a diameter equaling the wavelength of the ultrasonic signal. Thus, any increase or decrease of the diameter of the spherical members will cause a corresponding decrease in ultrasonic energy absorption.

It is an object of the present invention to provide an apparatus in which spheres of a predetermined diameter are energized with ultrasonic energy having a frequency approximating the wavelength of the diameter of the spheres in which the intensity of the ultrasonic energy passing through the spheres is measured to determine the relative transmission of ultrasonic energy through the spheres.

In the present invention, the intensity of the ultrasonic signal will be at its lowest when the ultrasonic energy is at a wavelength equaling the diameter of the spheres and will raise proportionately as the diameter of the spheres shifts by either expansion or contraction.

A feature and advantage of this invention lies in the utility of the aforesaid invention in nonreactive measuring changes in volume of spherical particles such as formed of cross-linked polymers during intervals when the polymers are submerged in particularly solvent materials, such solvent materials being active to either cause swelling or contraction of the spheres dependent upon the activity of the solvent. Thus, in the present invention, the intensity of the ultrasonic signal is an analogue of the size of the spherical particles.

A further object of this invention lies in the fact that the measuring apparatus exerts no physical pressure on the system which might tend to distort the spherical members during readout or measuring.

Another feature and advantage of the invention lies in the fact that the readout is obtained almost instantaneously and need not rely on mechanical measuring apparatuses. Thus, the device of the present invention allows the spherical members to be measured dynamically during fluid analysis such as in instances where continuous variations in fluid characteristics are to be detected.

Another feature and advantage of the invention lies in the fact that the measuring apparatus is nonreactive and is nondestructive to either the fluid or the reacting polymer spheres.

Another object of this invention is to provide an osmometer in which the spherical balls are maintained in a housing which will allow the balls to expand without external pressure being applied thereto and to be measured sonically in such a manner as to provide a readout which introduces no pressure to the spheres. This is of particular advantage in that fluid activity causes either internal pressure within the spheres or an increase in size so that in the present invention the fluid activity will result solely in changing the dimensions and there is no dimensional error that can be introduced by external pressure.

Other objects, features, and advantages of the present invention will be more apparent after referring to the following specification and attached drawings in which:

FIG. 1 is a schematic view of a principal embodiment of this invention;

FIG. 2 is a top plan view thereof;

FIG. 3 is a diagrammatic view showing a sine wave of the sound envelope in relation to a spherical ball;

FIG. 4 is an alternative embodiment of the invention using a sensitive transducer for transmitting and receiving ultrasonic signals.

Referring to the drawings, as seen in FIG. 1, there is provided a solid stress osmometer column A having packed therein a plurality of symmetrical spheres. Screens or filters 16 are biased on both sides of the body of spheres to maintain the spheres in evenly packed relationship by fluid permeable buffer bodies 18 mounted between the screens and the column top and bottom plates 19 and 20. The permeable buffer bodies 18 are formed of oil or other materials which are of such a nature as to cause no positive pressure on screens or filters 16. The screens or filters 16 are slidably mounted within column A so that they will expand outwardly or inwardly without interjection of pressure on the spherical balls or bodies 23. This is important in that any external pressure applied to the spheres will restrict their growth in size as a result of fluid activity in that, when spheres are subjected to active fluid while being maintained in a constant volume area, the spheres will not change in diameter but will exhibit a pressure buildup internally. Thus, in the present device, the floating screens 16 are arranged to apply no pressure externally to the spheres by providing a chamber of changeable dimensions in conformity with the spheres' displacement. The column is formed of a conventional tubular or rectangular wall 15 and is provided on the top plate 19 and the bottom plate 20 with a fluid input tube 25 and a fluid output tube 26 respectively.

In operation, test fluid is injected into input tube 25 wherein it flows through the packing or buffer body 18, through filters 16, through spherical balls 23 and thence out through the filters 16, packing 18 and the exit tube 26.

Spherical balls 23 are as taught in applicant's copending patent application, Ser. No. 540,317, formed of a uniform size and are formed of a suitable resin or polymeric material. Characteristically of such spheres, there is a predictable tendency of such spheres to either absorb or give up fluid contents in accordance with the activity of test fluid with the spheres. Thus, test fluids with a high degree of activity will cause the spherical balls to expand and fluids with a low degree of activity will cause constriction. Due to the fact that the spheres are of a common diameter and capacity, they will react commonly to the fluid contact within the chamber.

The subject invention is concerned with measuring the degree or the extent of expansion or constriction of the spheres occasioned by the fluid in contact therewith. To accomplish the aforesaid measurements, as seen in FIG. 1, an output ultrasonic transducer 30 is employed in ultrasonic communication but in liquid isolation by a suitable barrier 31 from spheres 23. The ultrasonic transducer is supplied with energy from ultrasonic generator 32 in such a way as to produce an ultrasonic signal at a given amplitude and a predetermined frequency, the frequency of which is determined in relation to the sphere size as will hereinafter be described.

In the embodiment of FIG. 1, a similar transducer but arranged to detect the ultrasonic signal, hereinafter referred to as receiving transducer 35, is similarly arranged in fluid isolation from the spheres but in ultrasonic communication through a diaphragm 36. Such a diaphragm is formed from materials which are impervious to liquid penetration but which will allow ultrasonic penetration therethrough.

It is important that the sonic or ultrasonic generating transducer 30 and the sonic or ultrasonic receiving transducer 35 be mounted to project the sonic energy to the spheres to receive the sonic energy from the spheres with a minimum of direct sonic coupling to the chamber or housing A. This is accomplished by providing a sonic absorber 37 which mounts the two transducers on the column and functions to absorb the sonic energy so as to decouple the energy from the housing.

The output signal from transducer 35 is connected to an amplifier 38 and from there is integrated with the ultrasonic signal from ultrasonic generator 32 by integrator 39. The combination or integration of the two signals provides a differential signal which indicates the difference in amplitude between the transmitted signal from the audio generator 32 and the received signal from amplifier 38. The differential is obviously the resultant of loss of transmitted energy through the spheres.

The diameters of spheres 23 and the frequency indicated by the sine wave 40 of the sonic envelope shown in FIG. 3 are selected so that the diameter of each sphere is approximately the wavelength of the ultrasonic signal. As can be seen by the overlay, a typical ultrasonic wave form 40 is show with reference to the physical size of spheres indicated in FIG. 2 and FIG. 3. It is noted that the spheres are in compacted relationship so they are all in tangential contact with adjacent spheres.

When the wavelength is exactly equal to the diameter of the sphere, there is a maximum attenuation of the ultrasonic energy. When the sphere either increases or decreases in size, the extent of attenuation similarly decreases. Consequently, the relative amount of ultrasonic energy or the differential seen by integrator 39 will indicate an analogue of the extent of variation from the fixed diameter of the spheres. This, in turn, is directly correlated to the activity of the fluid passed in communication with the spheres.

In FIG. 4, there is an alternative embodiment of the invention which comprises a similar type of sensing tube carrying spherical members 23 of the same character as specified above in FIG. 1 in an osmometer column B identical to the structure shown in FIG. 1 excepting that a single transducer 60 is employed entering into the sphere containing portion of the column. As before, a fluid impervious membrane 62 is employed separating transducer 60 from the chamber. In this instance, the transducer energized from an ultrasonic generator 63 generates an ultrasonic signal which is reflected back through the spherical members back to transducer 60 and thereafter converted to electrical energy which is detected by detector 64. The signal amplitude from the ultrasonic generator 63 and from detector 64 is compared at integrator 65 wherein the difference of the signal level is the analogue of the attenuation of the ultrasonic signal effected by spheres 23. As in the embodiment of FIG. 1, a sonic decoupler 66 is mounted between transducer 60 and the chamber B.

While as previously expressed in the application the ultrasonic frequency has been described as having a wavelength equal to the diameter of the spheres, it is believed obvious that the device can function with good efficiency when the diameter of the spherical members bears a harmonic relationship to the wavelength. Thus, these spheres for example can be a half wavelength or two warelengths in diameter and still obtain the results above indicated. For example, a common size for such spheres is approximately 210 microns. In this case, the wavelength can be equal to 420 microns or 105 microns and still obtain the results specified above.

As can be seen in the present invention, the diameter shift of the spheres due to expansion or constriction creates a shift in the amount of energy which is absorbed by the spheres. The aforesaid shift in energy is measured by the differential between the input and the output signals. Thus, the measurement of the input and the output signal is in direct correlation to the change in size of the spherical members.

It can be seen that this form of measurement is non-destructive, does not interfere with fluid flow and is capable of almost instantaneous readout. It can also be seen that the conditions of pressure and fluid flow characteristics through the spheres remain constant whether in a read or a non-reading phase of operation. Because of this factor, predetermined standards once calculated will remain fixed and repeatable.

While one embodiment of this invention has been shown and described, it will be apparent that other adaptations and modifications can be made without departing from the true spirit and scope of the invention.

What is claimed is:

1. In an osmometer of the type having a nested plurality of polymeric spheres of a fixed diameter, an apparatus for indicating the size of said spheres comprising: means for generating an ultrasonic signal of a predetermined frequency from a range of frequencies corresponding in wavelength dimension to the diameter of the spheres, means constructed and arranged to pass said ultrasonic signal at a fixed amplitude against said spheres, ultrasonic detecting means constructed and arranged to receive the ultrasonic signal from the ultrasonic signal generator means after passing said spheres, and means to measure the amplitude of the detected ultrasonic signal to determine the attenuation of the ultrasonic energy effected by the passage of the ultrasonic energy by said spheres.

2. A device according to claim 1 and wherein said wavelength of said predetermined ultrasonic frequency is a wavelength equal to approximately the diameter of said spheres.

3. A device according to claim 1 and wherein said wavelength of said predetermined frequency is a harmonic wavelength equal to approximately the diameter of said spheres.

4. A device according to claim 1 and wherein said spheres are mounted in a columnar relationship and wherein said ultrasonic generating and detecting means are mounted on the opposite side of the column of spheres.

5. A device according to claim 1 wherein said spheres are mounted in a columnar relationship and said ultrasonic generating and detecting means are located in juxtaposition wherein the ultrasonic energy passes by said spheres and thus returns to said receiving transducer.

6. In an osmometer of the type having a nested plurality of polymeric spheres of a fixed diameter, a compartment for said spheres, means to pass fluid through said spheres in said compartment, means rendering said compartment expandable in relation to the expansion of said spheres without applying pressure on said spheres, means for generating an ultrasonic signal of a predetermined frequency selected from a range of frequencies corresponding in wavelength dimension to the size of the diameter of the spheres, means constructed and arranged to pass said ultrasonic signal at a fixed amplitude against said spheres, ultrasonic detecting means constructed and arranged to receive the ultrasonic signal from the ultrasonic signal generator means after passing said spheres, and means to measure the amplitude of the detected ultrasonic signal to determine the attenuation of the ultrasonic energy effected by the passage of the ultrasonic energy by said spheres.

7. A method for determining the size of uniformly sized spherical spheres in which the activity of said fluid flow through said spheres functions to create a change in size of said spheres uniformly in accordance with the fluid flow thereby in a confined area, generating an ultrasonic signal of predetermined amplitude having a frequency selected from a range of frequencies corresponding in wavelength to the diameter of the spheres, passing said signal through the spheres, measuring the intensity of said ultrasonic signal after the ultrasonic signal has passed through the spheres and indicating the differential between the input and the output ultrasonic signals to determine the attenuation of the ultrasonic signals caused by the spheres.

8. A method according to claim 7 in which said ultrasonic signal is selected from a frequency range approximating a wavelength equal to the diameter of said spheres when unactuated by fluid flow thereby.

9. A method according to claim 7 in which said ultrasonic signal is selected from a frequency range approximating a harmonic wavelength equal to the diameter of said spheres when unactuated by fluid flow thereby.

10. A method according to claim 7 and maintaining said spheres at all times in absence of changes of external pressure during expansion and contraction.

References Cited

UNITED STATES PATENTS

| | | | |
|---|---|---|---|
| 2,848,891 | 8/1958 | Hunter et al. | 73—67.5 |
| 3,093,998 | 6/1963 | Albertson et al. | 73—61 |
| 3,208,286 | 9/1965 | Richard. | |

LOUIS R. PRINCE, *Primary Examiner.*

J. W. ROSKOS, *Assistant Examiner.*

U.S. Cl. X.R.

73—432, 67.2, 67.5